US007317729B2

(12) United States Patent
Calver et al.

(10) Patent No.: US 7,317,729 B2
(45) Date of Patent: Jan. 8, 2008

(54) SYSTEM AND PROCESS FOR PROVIDING AUXILIARY INFORMATION FOR A PACKET-SWITCHED NETWORK OF SHARED NODES USING DEDICATED ASSOCIATIVE STORE

(75) Inventors: Kenneth L. Calver, Lexington, KY (US); James N. Griffioen, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 840 days.

(21) Appl. No.: 10/131,315

(22) Filed: Apr. 23, 2002

(65) Prior Publication Data

US 2002/0154639 A1 Oct. 24, 2002

Related U.S. Application Data

(60) Provisional application No. 60/285,727, filed on Apr. 23, 2001.

(51) Int. Cl.
*H04L 12/28* (2006.01)
*H04L 12/56* (2006.01)
(52) U.S. Cl. ...................... 370/400; 370/389
(58) Field of Classification Search ............... 370/400, 370/389
See application file for complete search history.

(56) References Cited

U.S. PATENT DOCUMENTS

| 5,668,800 | A | 9/1997 | Stevenson | 370/248 |
|---|---|---|---|---|
| 5,933,602 | A | 8/1999 | Grover | 709/224 |
| 6,076,117 | A | 6/2000 | Billings | 709/253 |
| 6,115,747 | A | 9/2000 | Billings et al. | 709/231 |
| 6,275,492 | B1* | 8/2001 | Zhang | 370/392 |

(Continued)

OTHER PUBLICATIONS

DARPA ITO Sponsored Research, 1999 Project Summary ActiveCast, University of Kentucky [online] [retrieved on Apr. 24, 2001] Retrieved from Internet: <URL: http://www.darpa.mil/ito/psum1999/J051-0.html>.

(Continued)

*Primary Examiner*—Edan Orgad
*Assistant Examiner*—Blanche Wong
(74) *Attorney, Agent, or Firm*—Macheledt, Bales & Heidmiller LLP

(57) ABSTRACT

A system and process for providing auxiliary information about a distributed network of shared nodes, at least a plurality of the nodes being adapted for receiving at least one type of ESP-(associative ephemeral store processing) packet. Available for access at each of the plurality of ESP-adapted nodes is a dedicated associative store wherein a value, if bound to a tag, is only accessible as a bound (tag, value) pair for a short time period, $\tau$. Different types of packets are contemplated for routing through the ESP-capable plurality of nodes such as those arbitrarily identified herein as a 'first' and 'second' type: each first type packet has at least one field comprising an opcode identifying an instruction, and a tag; each second type packet has an opcode identifying an instruction an LOC field containing an identifier of a location for execution of an operand by the second packet instruction at any one of the ESP-capable plurality of nodes. In another aspect, each of the ESP-capable plurality of nodes has input and output port units and a centralized unit; an associative store may be dedicated to one or more of the port units as well as to the centralized location.

25 Claims, 7 Drawing Sheets

U.S. PATENT DOCUMENTS 6,990,103 B1 * 1/2006 Gollamudi ............. 370/395.31
2002/0051445 A1 * 5/2002 Drottar et al. .............. 370/362

OTHER PUBLICATIONS

Calvert, K.L. *Architectural Framework for Active Networks*, Version 1.0, Jul. 27, 1999.

Schwartz, Beverly et al. *Smart Packets for Active Networks*, Mar. 1999. IEEE 2nd conference in Open Architecture and Network Programming.

Michel, Scott et al. 'Adaptive Web Caching: Towards a New Global Caching Architecture', [online] [retrieved on Apr. 7, 2002]. Retrieved from the Internet: <URL: http://wwwcache.ia.net/events/workshop/25/3w3.html>.

'Wide Area Networks: Packet Switching'. [online] [retrieved on Apr. 2, 2002]. Retrieved from the Internet: <URL: http://www.cis.ohio-state.edu/~gurari/couse/cis677/cis677Se30.html>.

"Router", Computer Desktop Encyclopedia, The Computer Language Company, Inc., © 1981-1999.

\* cited by examiner

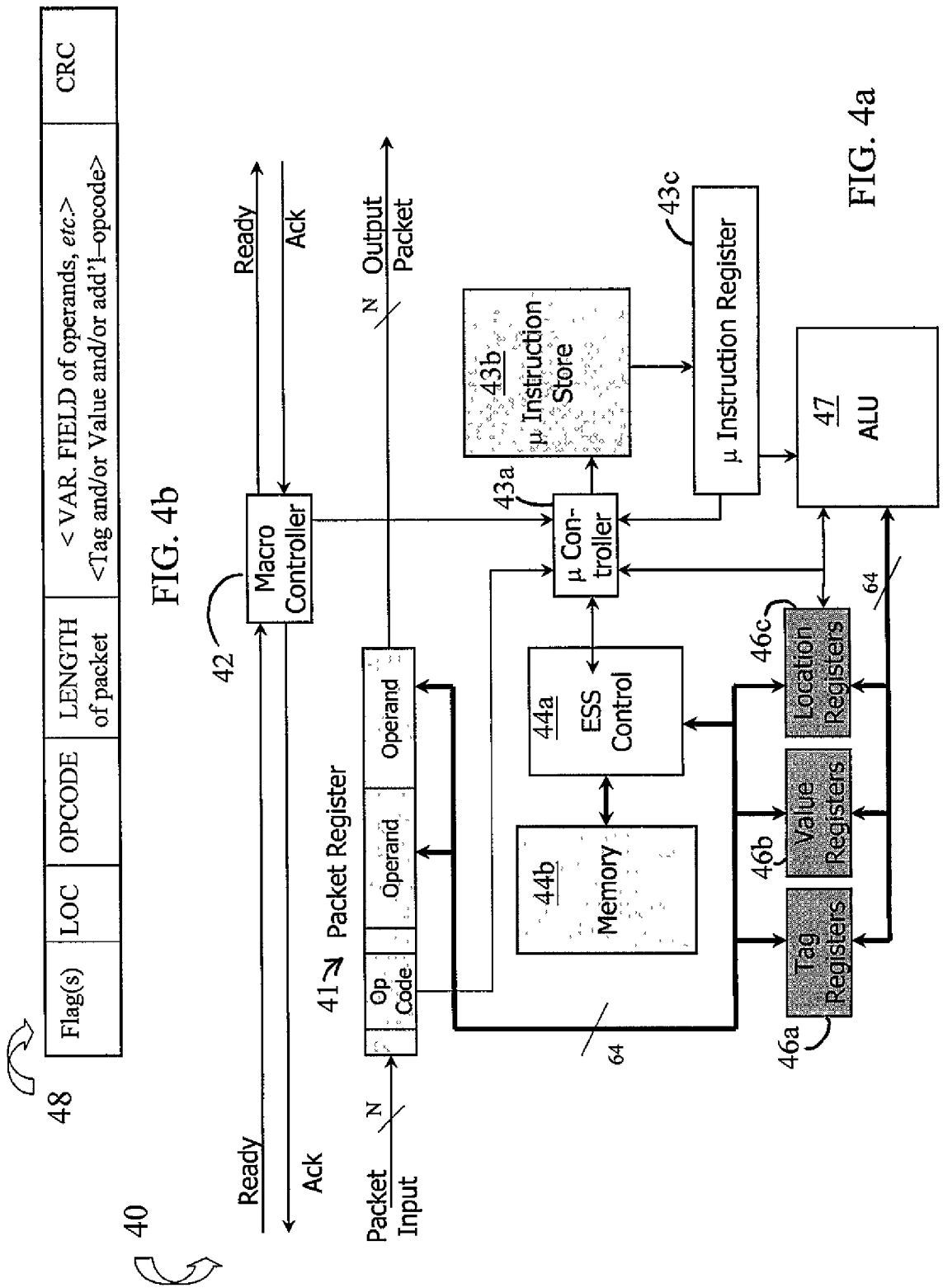

SYSTEM AND PROCESS FOR PROVIDING AUXILIARY INFORMATION FOR A PACKET-SWITCHED NETWORK OF SHARED NODES USING DEDICATED ASSOCIATIVE STORE

PRIORITY PROVISIONAL APPLICATION

This application claims priority to pending U.S. provisional patent application Ser. No. 60/285,727 filed by the assignee hereof on Apr. 23, 2001.

GOVERNMENT SUPPORT

The invention disclosed herein was made with United States government support awarded by the following agencies: Defense Advanced Research Projects Agency (DARPA) and Air Force Material Command (USAF), under contract number F30602-99-1-0514. Accordingly, the U.S. Government has certain rights in this invention.

BACKGROUND OF THE INVENTION

Field of the Invention

In general, the present invention relates to techniques for providing network support for implementing new network-level services. Although the Internet's "best-effort" datagram forwarding service is a flexible building block for a wide variety of end-to-end services, new network-level services would benefit a wide range of emerging applications. Example services include QoS support, multicast, and network-level anycasting. Currently, new services are implemented at the end-systems. It is quite useful to have the capability of initiating distributed computations supported by the shared nodes (e.g., routers) of a network and have the results returned to an end-user/system in a returning packet. Examples of auxiliary computations that address important issues of performance and scalability of networked applications, which may be carried out though the network in a hop-by-hop fashion as packets travel throughout, include:

Aggregating feedback from receivers in a multicast group so that a sender need only receive a single message that contains the aggregated information. Examples of the kind of feedback that can be collected in this way are number of receivers in the group, the maximum loss rate across all receivers in the group, or minimum bandwidth acceptable to any receiver.

Collecting information about the network state, e.g., the average or maximum queue occupancy along a given path.

Detecting features of network topology, such as the intersection (common nodes visited) of two paths through the network.

A common feature of these computations is that packets transfer information from one node (end system or router) to another, for combination with information carried in other packets. Packets generally arrive at a node asynchronously, so it is critical that the state of each computation be maintained at each node between packet arrivals. These computational demands make it difficult for deployment in a network environment such as the wide area network referred to as the Internet, where router resources (especially memory) are extremely scarce. Thus, as one will appreciate, any of these new services would be much more effectively implemented inside the network architecture of the instant invention which utilizes associative memory/store, and more-particularly, dedicates an ephemeral state store for temporary holding of information carried hop-by-hop throughout a distributed network. One can better manage network overhead as applicants' have done by allocating a minimum amount of time—preferably a short, fixed interval—after which certain data is no longer accessible.

The invention is directed to a system for providing auxiliary information about a distributed network of shared nodes, at least a plurality of which are adapted for receiving one or more ESP-compatible type packets. The unique network platform and associated flexible technique of the invention, embody a design approach that 'flows upstream' against traditional design engineering notions of problem-solving, namely that in order to maintain, and better-yet improve, the scalability of services offered for modern complex distributive networks, one employs a technique utilizing ephemeral store. This arises as follows: any value bound to a particular tag or key and stored in any dedicated associative store for access and use by a computation is only accessible for a short time period, $\tau$. Preferably each dedicated associative store, operating as an ephemeral state store, provides a time-limited, temporary holding mechanism such that once the selected time period, $\tau_i$, expires for a given bound (tag, value) pair, the pair effectively vanishes from that node and is not accessible, leaving the space reclaimable. The lifetime of any bound (tag, value) pair, $\tau_i$, is selected to be long enough to support an associated computation or instruction yet not so long as to create burdensome management overhead.

A key to the scalability of the current Internet, is the fact that it provides best effort delivery: it effectively operates without a need to guarantee that all packets will be delivered. With a focus toward maintaining and improving scalability, the system and technique of the invention takes on a best effort orientation: it can readily tolerate the tradeoff of anticipated loss of data since it occurs infrequently enough to provide very useful information about complex networks. Thus, the unique best effort platform of the invention fits comfortably within the current architectural context of modern routers and internet protocol (IP).

The invention includes a network-level building block service that is controlled and manipulated by the end-systems, allowing applications to enhance standard best-effort services or implement completely new application-level services that are not possible in the current Internet infrastructure. The building block service disclosed is unique in that it allows end users to temporarily deposit very small amounts of data at nodes (routers) inside the network. The data can then be gathered and manipulated via packets sent by cooperating end users. The system of the invention allows applications to discover very specific information about the network to, for example optimize communication performance without revealing everything about the network and its topology and without imposing substantial additional load or management overhead on the network. Ideally, such a service will exhibit the same characteristics that make IP itself robust and scalable; things like best-effort delivery, processing packets independently, i.e., no connection setup, using a fixed (small) amount of resources per packet; moreover, there should be a clean separation between the per-packet local processing and the global coordination required to implement end-to-end services. In IP, this is exemplified by the separation between forwarding function, i.e. moving each packet along a chosen path to its destination, and the routing function, i.e. choosing the path to use for each destination. The novel service disclosed hereby exhibits these characteristics: It is scalable, providing best-effort delivery and whereby the amount of memory, processing and management power required of network nodes is limited for efficiency. As mentioned, one key feature to bounded resource usage is utilization of the associative ephemeral state store which allows information to be stored at a node for avery short, fixed time combined with small (fixed) per-packet processing operations. End-systems combine these building blocks via packet-initiated probe computations that provide the global coordination needed to implement end-to-end services While one conventional approach has led to putting state in the network on behalf of users in soft state where users must periodically refresh the information—otherwise it is automatically deleted or reclaimed by default—the periodic refresh messages sent to keep data from being reclaimed consume network and processing capacity. Moreover, reducing refresh rate increases the time required to react to a fault and prolongs the waste when resources are no longer used, whether due to a fault or to normal termination.

Distinguishable from this and according to the invention, three main building blocks or components of associative store ephemeral state processing (ESP) according to the invention, cooperate in concert such that: information carried in packets is temporarily stored at ESP-capable nodes of the network; if the limited associative store life is not exceed, the carried information may be combined with information from other packets and then forwarded to a destination. All of this occurs as directed and controlled by a user, with no out-of-band signaling or control setup required. Ephemeral state processing (ESP)-capable nodes within the network operate independently of each other. The third building block provides the means of invoking the local building blocks operational at each of a plurality of shared nodes in the network and tying them together into an end-to-end service. Auxiliary information is extremely useful in network analysis and performance efforts, and within the scope of the invention a wide variety of categories received in a variety of forms (such as messages/datagrams) are contemplated, including without limitation those expressly identified as follows: information about a computational state of any group or all ESP-capable nodes cooperating to implement an application service; information (e.g, a message) comprising feedback about any of a plurality of receivers of a multicast group; information about at least one node of the shared nodes; information about the distributed network's state; information about at least one feature of the distributed network's topology; location information about at least one active service within the distributed network; information about messages/datagrams transmitted anywhere within the distributed network; and statistical performance information about at least one aspect of the distributed network.

SUMMARY OF THE INVENTION

It is a primary object of this invention to provide a system and process for providing auxiliary information about a distributed network of shared nodes, at least a plurality of the nodes being adapted for receiving at least one specialized type of packets. Available for access at each of the plurality of nodes is a dedicated associative store wherein a value, if bound to a tag, is only accessible as a bound (tag, value) pair for a short time period, $\tau$. Different types of packets are contemplated for routing through the plurality of nodes such as those arbitrarily identified as a first and second type: each first type packet having at least one field comprising an opcode identifying an instruction and a tag; each second type packet having a macro opcode identifying an instruction an LOC field containing an identifier of a location for execution of an operand by the macro instruction at any one of the plurality of nodes. Once a first type packet is received by any of the plurality of nodes with dedicated associative store its pre-selected tag may be overwritten according to its associated instruction.

Advantages of providing the new system and associated technique, several of which have been identified above, include without limitation:

(a) Mode of operation—The invention provides a lightweight, flexible platform which provides useful auxiliary information in a variety of contexts from large-scale one-to-many applications, bootstrapping other router-based services, identifying nodes with certain properties, identifying common nodes along any particular path, and so on.

(b) Flexibility of use—The system allows packets to store and retrieve fixed-size bit strings throughout the network. The dedicated ephemeral state store supports fast access to millions of values per node using commodity memory with negligible management overhead. Packets can leave information at a router and later-in-time packets can modify or pick up that information.

(c) Simplicity of use—The dedicated associative memories allow data values to be associated with keys or tags for subsequent retrieval, the values and tags are preferably fixed-size bit strings, no structure being imposed on either tags or values by the associative store—but rather, their meaning and structure being defined by the application in which they are used toward the providing of auxiliary information.

(d) Design Versatility—The system and technique of the invention are suitable for implementation based in software or based primarily in hardware, fitting comfortably within the current architectural context of modern routers and internet protocol (IP)—thus making implementation and operation economically feasible. An associative store may be dedicated to one or each of several port units as well as to a centralized location of a given node, allowing the binding operation to be moved 'off-site' from any loaded section of the node.

Briefly described, once again, the invention includes a system for providing auxiliary information about a distributed network of shared nodes, at least a plurality of the nodes adapted for receiving one or more type of packets. Available for access at each of the plurality of nodes is a dedicated associative store wherein a tag may be bound to a value and, if so bound, is only accessible as a bound (tag, value) pair for a short time period, $\tau$. Different types of packets are contemplated for routing through the plurality of nodes such as those arbitrarily identified as a first and second type: each first type packet having at least one field comprising an opcode identifying an instruction and a tag; each second type packet having a macro opcode identifying an instruction an LOC field containing an identifier of a location for execution of an operand by the macro instruction at any one of the plurality of nodes. Once a first type packet is received by one of the plurality of nodes with dedicated associative store, its pre-selected tag may be overwritten by a processing unit at that node according to an instruction. Tags are preferably randomly selected; and by designing the space of tags to choose from large enough, one can ensure that the probability of users choosing the same tag ("colliding") during an interval [t, t+$\tau$] is extremely small. First type packets may additionally contain: an LOC field containing an identifier of a location for execution of the opcode instruction also being carried by the packet; a destination ID for guiding the packet through the nodes adapted for receiving first type packets, toward its destination; and a flow ID for sorting packets for serial execution at a node. Packets may travel alone or piggybacked to datagrams with additional information.

Operand(s) associated with an opcode instruction within either the first or second type packet may be carried in the respective packet to the node for execution or retrieved from a respective associative state store, or elsewhere, upon arrival at a node. The time period, $\tau$, after which bound pairs are no longer accessible from a dedicated associative store is selected according to application and other network parameters; one might prefer $\tau$ to be less than a product of six multiplied by a packet round-trip time (RTT) of a majority of any particular type of packets through the distributed network, for example, $\tau<6*98\%$ RTT.

Auxiliary information may comprise computational information selected from those identified, among other categories of information/data, as follows: information about a computational state of any group or all ESP-capable nodes cooperating to implement an application service; information (e.g, a message) comprising feedback about any of a plurality of receivers of a multicast group; information about at least one node of the shared nodes; information about the distributed network's state; information about at least one feature of the distributed network's topology; location information about at least one active service within the distributed network; information about messages/datagrams transmitted anywhere within the distributed network; statistical performance information about at least one aspect of the distributed network; and so on.

In another aspect of the invention, the focus is on a system wherein each of the plurality of nodes has input and output port units, each of which can comprise a port card for example, and a centralized unit comprising a router. An associative store may be dedicated to one or more of the port units as well as to the centralized location containing the switching fabric. Based upon resources at the node, binding operations may be directed to occur 'off-site' from main router functions, at a port card, or remain central and utilize router processing capability. In this case, the LOC field preferably further identifies where, at the node, a respective instruction is to be executed. One or more packet types can be directed to execute at any one or more nodes adapted to handle the packet type, in a sequence according to a computational model to carry out a specific task such as determine or count the number of participants in a large multicast group, locate lossy links throughout the network, or determine where in the network certain more-heavyweight functions (e.g., packet duplication for multicast, marking or logging for traceback of denial-of-service attacks, ingress filtering, and redirection of packets to a proxy) should be invoked.

In a further aspect of the invention, the focus is on a process for providing auxiliary information about a distributed network of shared nodes. The process includes, first, providing a dedicated associative store at each of the plurality of nodes such that any value bound to a tag within a dedicated associative store as a bound (tag, value) pair, is accessible only for a short time period, $\tau$. Depending upon the packet type, the next step is to receive, at one of the plurality of nodes, a plurality of the packets. For each first type packet with received, a binding of each tag can be made to a value within the dedicated associative store at the node, this binding being only accessible as a bound (tag, value) pair within the dedicated associative store for the short time period, $\tau$. An instruction may be any of a wide variety, for example: test whether a value associated with a given pre-selected tag in a dedicated associated store is greater than or equal to a value carried in an incoming packet.

There are many further distinguishing features of the process of the invention, including: Executing each opcode instruction of each first type packet so received on a respective operand being carried by the first type packet; selecting a fixed-length bit string tag for each first type packet received without a pre-selected tag; comparing each tag within each first type packet received with each respective tag of a plurality of bound (tag, value) pairs earlier made and still accessible within the associative state store, and for every tag matched, accessing its bound value; discarding each bound (tag, value) pair so made upon expiration of the time period, $\tau$; and receiving a first packet sequence comprising at least a portion of first or second, or both, type packets thorough an input port unit of any one or more node such that the opcode instruction of each packet received is executed in a program sequence.

BRIEF DESCRIPTION OF THE DRAWINGS AND ATTACHMENT A

For purposes of illustrating the innovative nature plus the flexibility of design and versatility of the preferred system and process disclosed hereby, the invention will be better appreciated by reviewing the accompanying drawings (in which like numerals, if included, designate like parts) and ATTACHMENT A. One can appreciate the many features that distinguish the instant invention from known systems and techniques. The drawings and ATTACHMENT A have been included to communicate the features of the innovative platform structure and associated technique of the invention by way of example, only, and are in no way intended to unduly limit the disclosure hereof.

FIG. 1 schematically depicts a system 10 of the invention, the nodes of which 12 have dedicated processing and associative store components.

FIG. 2 schematically depicts elements/data fields of two different packet types 20 and 22 which can be deployed according to the invention through network 10.

FIGS. 3a-3c schematically depict three alternative routings of packet processing through a node. By way of example, each router depicted has three front-end, or input, port units and three back-end, or output, port units as well as a centralized location containing switch fabric components. Input and output processing can be through 'normal'/conventional processing paths or through one or more of the associative stores (labeled "ESP", ephemeral state processing) dedicated at each input port, output port and centralized location.

FIG. 4a depicts a high level schematic view of representative hardware components (including primary inputs and outputs) of a preferred processing unit 40 for carrying out ESP packet receipt, tag-value binding, and macro and micro instruction execution functionalities at any of the specially-adapted nodes (equipped with dedicated associative store and processing components)—such as nodes 12 of FIG. 1.

FIG. 4b schematically depicts a packet 48 of the type anticipated for receipt by the processing unit of basic functional components represented in FIG. 4a.

FIG. 5 schematically depicts one preferred implementation 50 of assisting with the functionalities of locating and comparing tags of incoming packets to those already bound, and retrieving and writing respective value(s) according to computation task.

Figure 6:
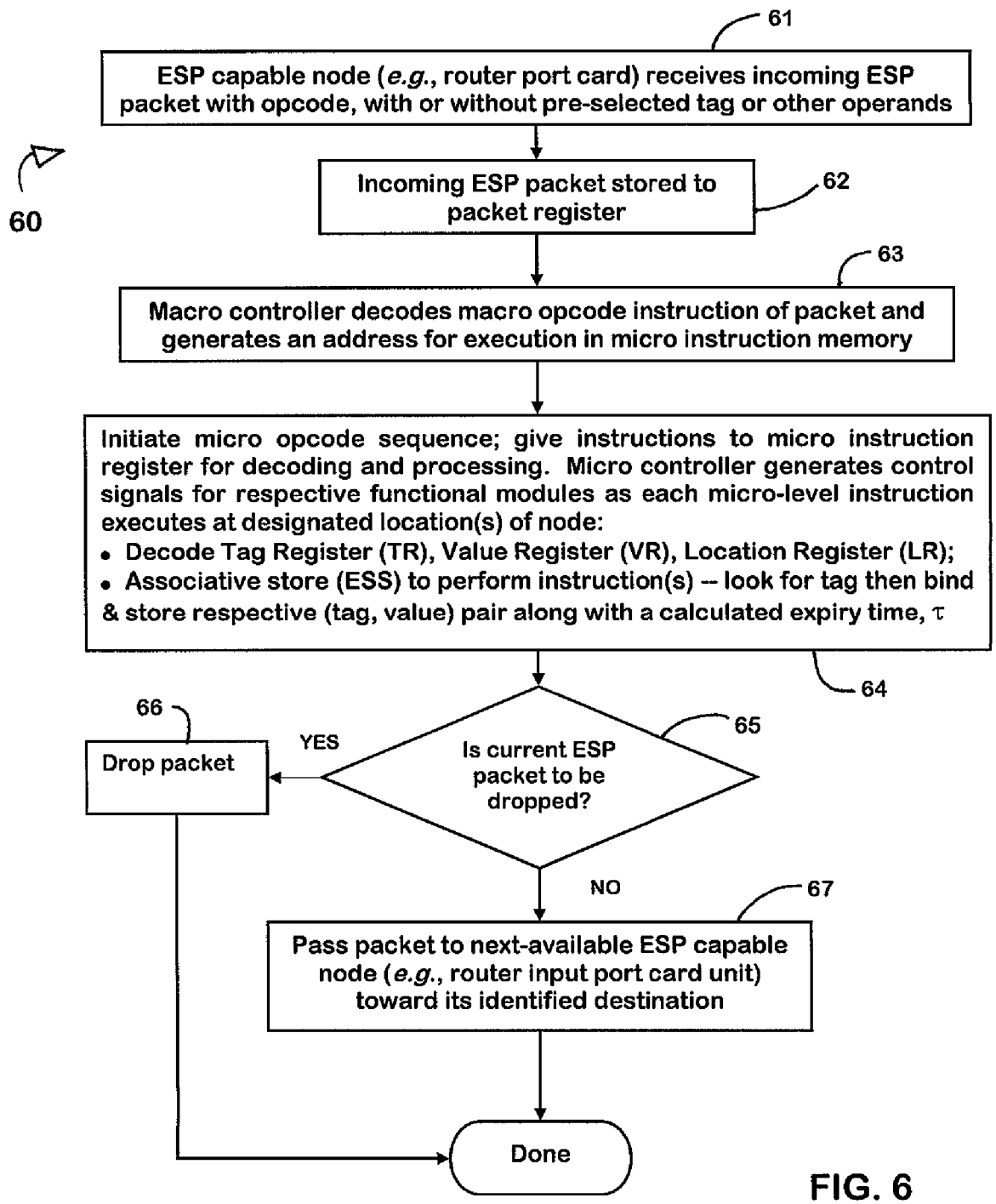
FIG. 6 is a flow diagram depicting one preferred implementation of a process of the invention utilizing the processing unit 40 in FIG. 4*a* and functionalities depicted in FIG. 5.
Figure 7:
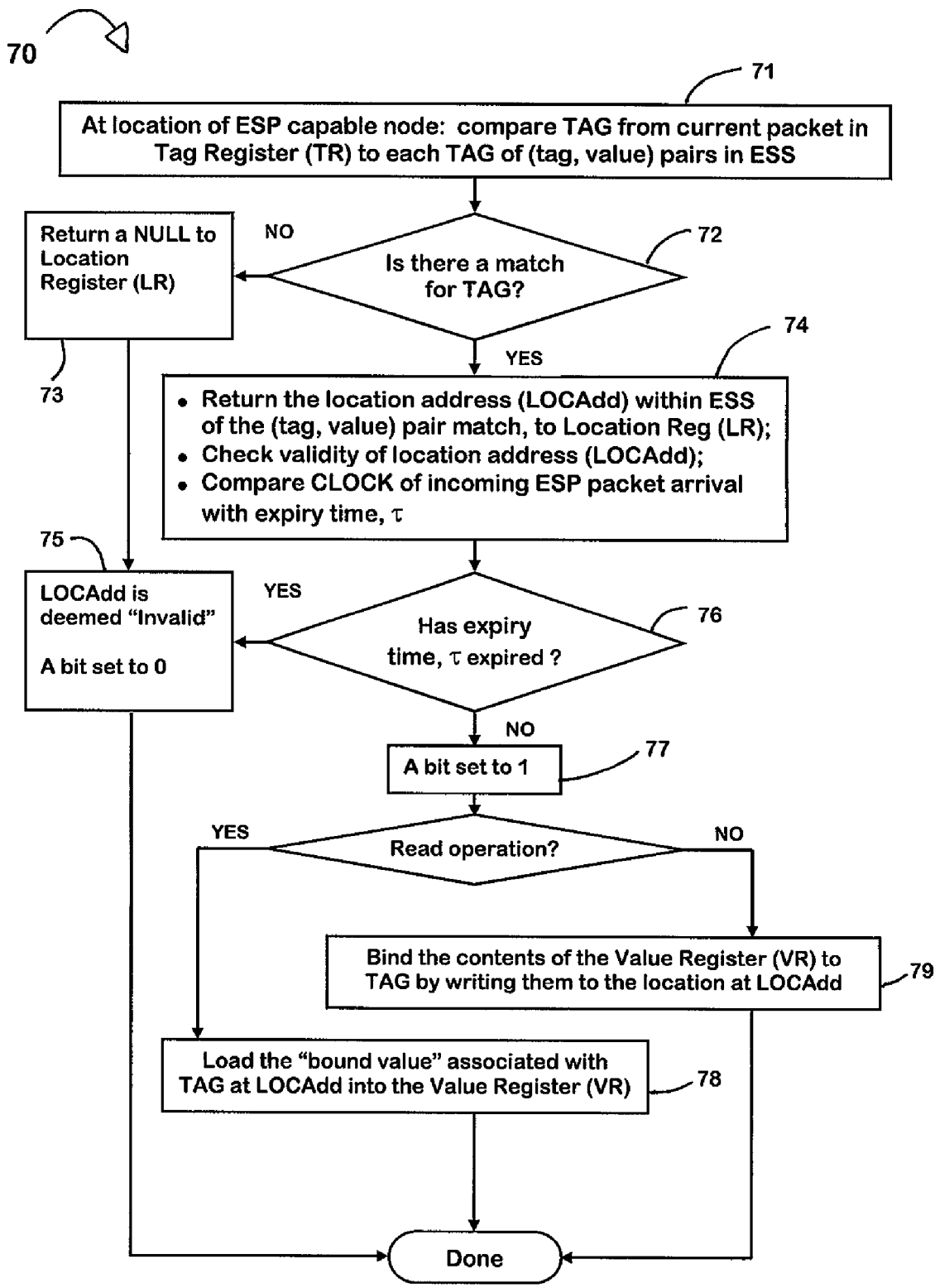
FIG. 7 is a flow diagram depicting one preferred implementation of a process of the invention 70 utilizing the processing unit 40 of FIG. 4*a* and packet type of FIG. 4*b*.
Figure 8:
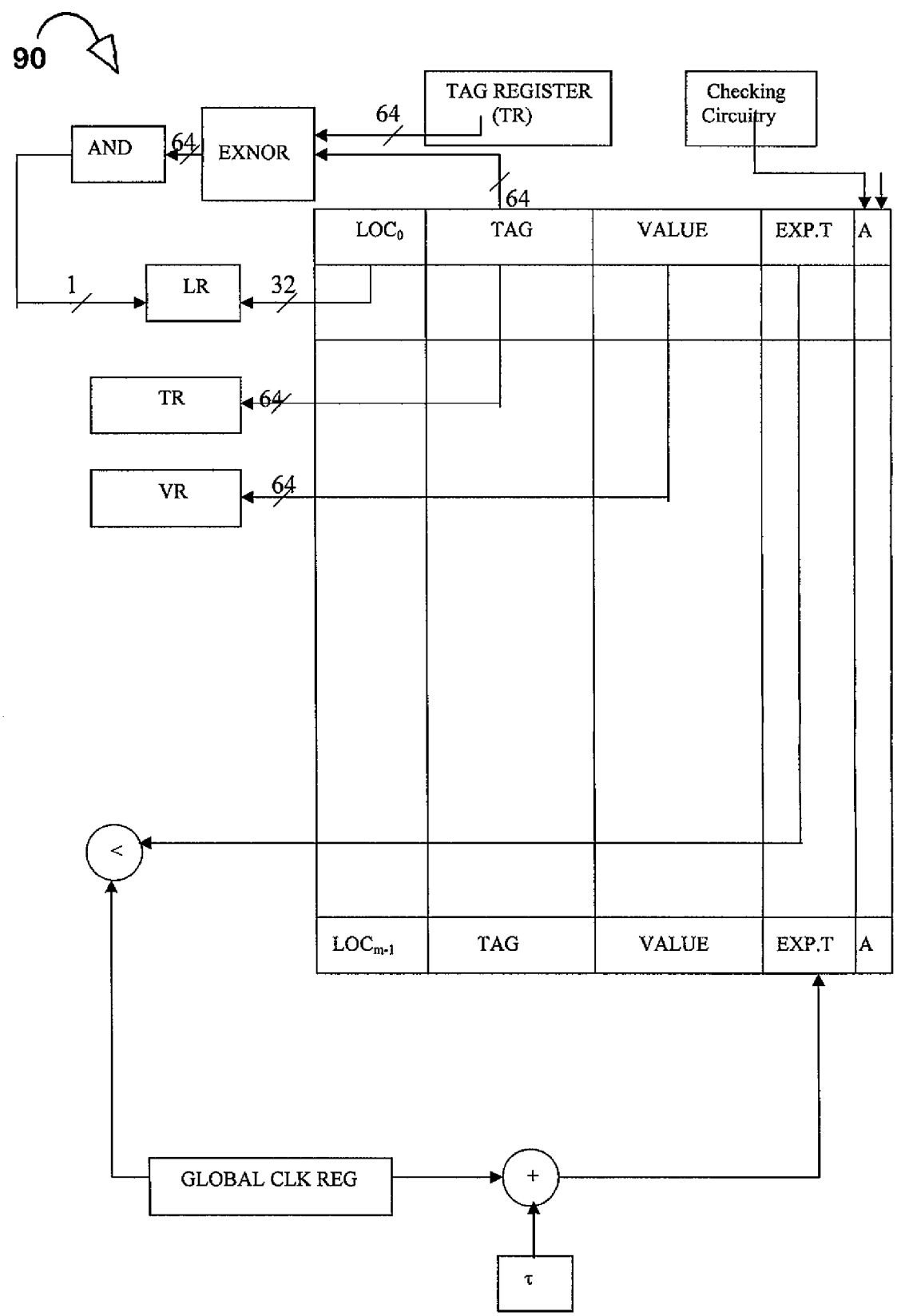

FIG. 8 schematically depicts further detail of functional units of ESP features represented in FIG. 4*a* to assist in carrying out the processes set forth in FIGS. 6 and 7.

ATTACHMENT A, a nine-page CONFIDENTIAL comprehensive manuscript authored by the applicants entitled "*Lightweight Network Support for Scalable End-to-End Services*", included herewith for its technical background and analysis and support of the system and process of the invention is hereby fully incorporated herein by reference to the extent necessary to aid in a thorough understanding of the technical background as well as the mathematical and rigorous engineering analyses performed by the applicants in support of their invention.

DETAILED DESCRIPTION OF THE PREFERRED AND ALTERNATIVE EMBODIMENTS

Figure 1:
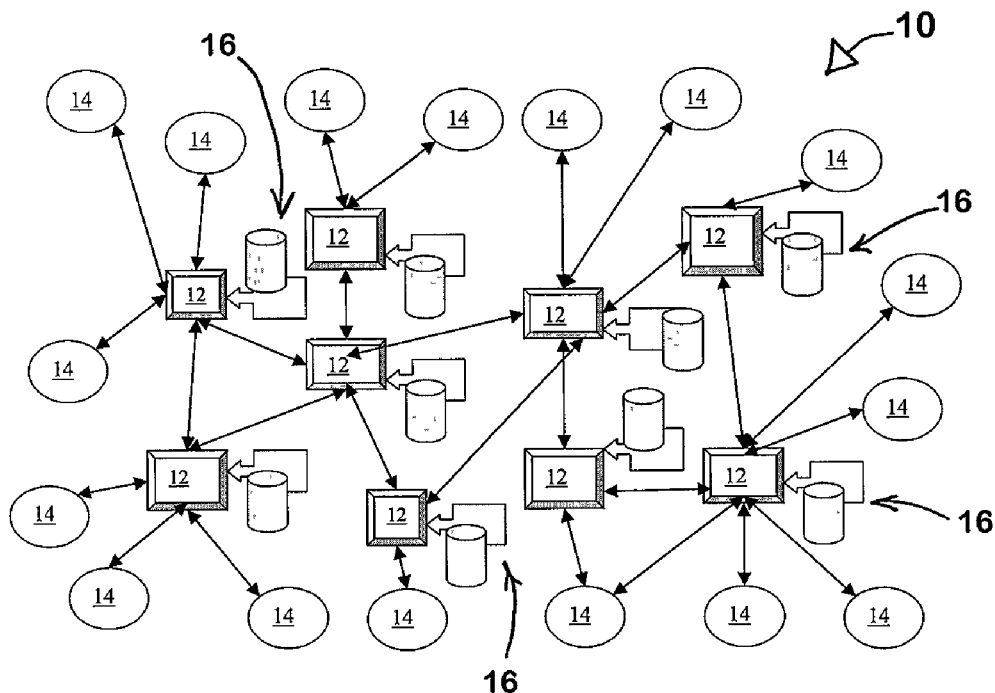

FIG. 1 schematically depicts a system 10 of the invention, the nodes of which 12 have dedicated processing and associative store components (collectively labeled 16) as identified in the Key. Preferably, an associative memory called an ephemeral state store is available at each shared node through which it is intended the ESP-packet types will pass, depending upon the specific auxiliary information sought at the end system(s) 14. An associative memory (also referred to as associative storage or store) is any data-storage device in which a location is identified by its informational content rather than by names, addresses, or relative positions, and from which the data may be retrieved. As contemplated herein, an associative store allows items of information to be associated with keys or tags for subsequent retrieval and/or update. A key/tag is a unit of information used as a label or marker. For example, the symbol written in the location field of an assembly-language coding form, when used to define the symbolic address of the data or instruction written on that line, is called a tag. The ephemeral state store is modeled, hereby, as a set of (tag value) pairs accessible for a short time period, $\tau$; preferably each tag has at most one value bound to it. Both tags and values can be fixed-size bit strings. No structure is imposed on either tags or values by the state store, though values may be interpreted in different ways by different operations based on computational objectives.

The associative/ephemeral state store (sometimes referred to herein as "ESS") is accessed through cooperative processing and functional sub-units such as those depicted in FIGS. 3*a*-3*c*, 4*a*, 5 and 9 to perform according to the invention (see, also, the applicants' technical discussion set forth in ATTACHMENT A hereto). Note that bindings cannot be prevented from disappearing: there is no way to refresh ephemeral state. The importance of a finite lifetime, $\tau$, is that it allows the resource requirements of computations using the store to be precisely bounded. Necessarily as a result of this, any value in the store must be retrieved within the state lifetime or lost. For scalability, a value $\tau$ is chosen to be as short as possible—while for robustness, it should be long enough for interesting uses/computations to be completed.

Figure 2:
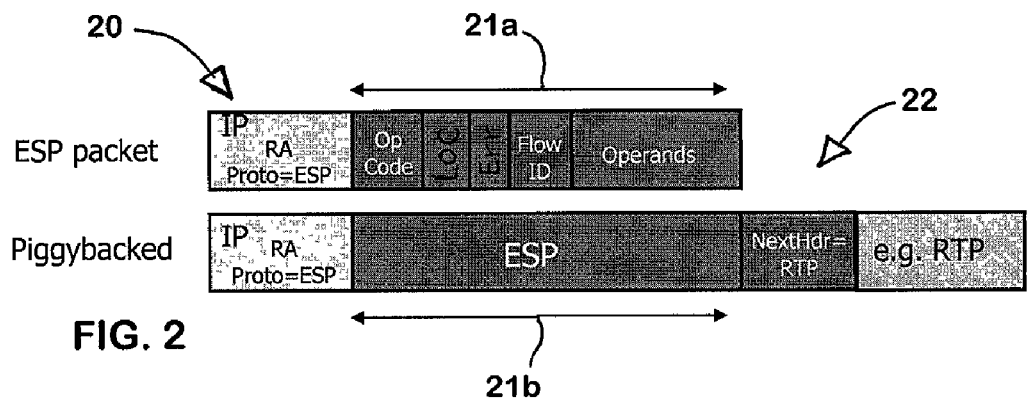

FIG. 2 schematically depicts elements/data fields of two different packet types labeled 20 and 22 which can be deployed according to the invention in connection with implementation 50 (FIG. 5) and processing unit 40 (FIG. 4) through network 10 of FIG. 1. The ephemeral state probe (ESP) packet 20 may contain, along with an IP option or extension header common to both types (e.g., Router Alert, "RA", option and a protocol number identifying the ESP protocol "Proto=ESP"), fields identified by way of example, at 21*a*: Opcode for identifying a macro ESP opcode instruction; LOC field identifying where processing or execution of the instruction will occur and/or where state is to be stored (input port card, output port card, both input and output port card, neither port card, or centralized within router switching fabric); Flow ID for sorting packets for serial execution according to a selected program sequence, Err(or) field for carrying error code from exceptions; and operands such as one dedicated for execution by the instruction and/or a pre-selected tag for ephemeral binding to a value in the associated store. The 'piggybacked' packet labeled 22 may include fields 21*b* similar to those collectively labeled 21*a*, as well as an IP option or extension header and NextHdr=RTP field (for identifying the type of the next header, for example).

Figure 3A:
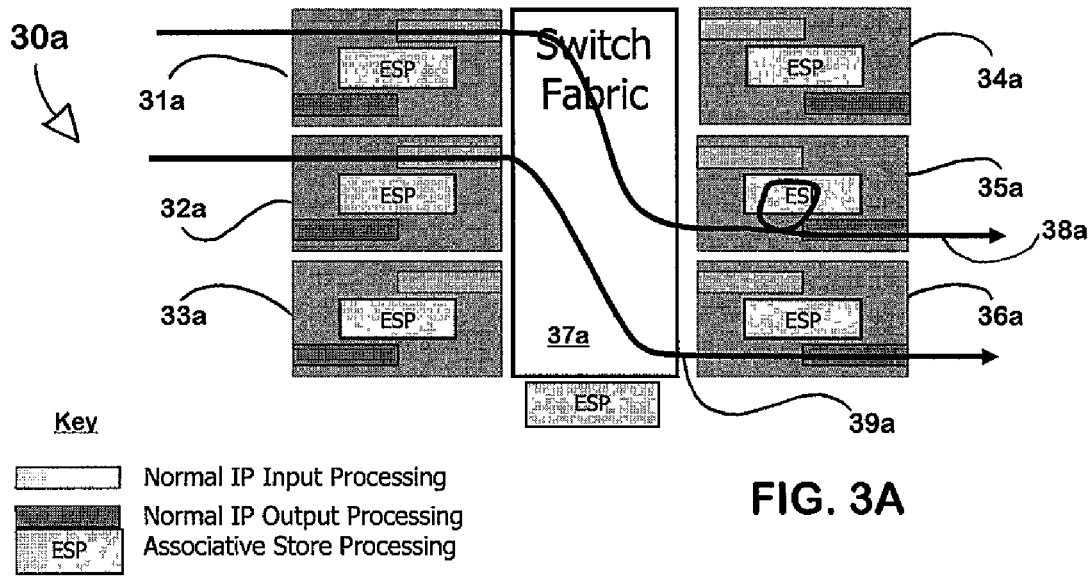
Figure 3B:
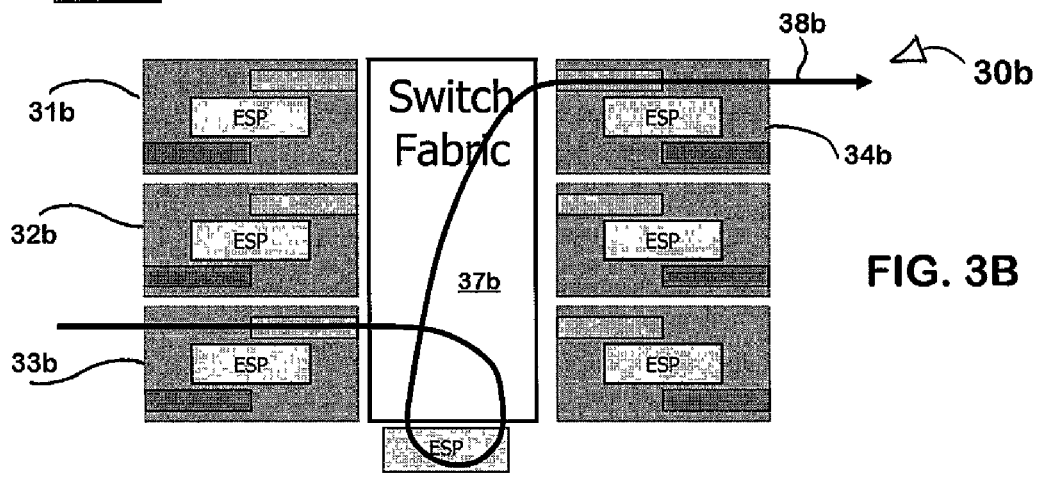
Figure 3C:
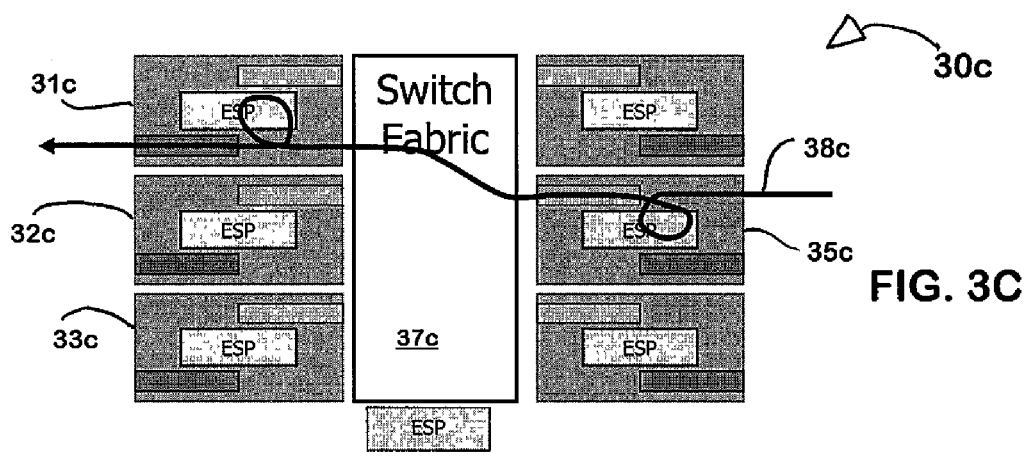

As ESP packets travel through the network toward a destination according to the type of end-to-end service the auxiliary support is targeting. As the packets move from and end-system or other point of origin/source through the shared nodes 12 with ESP capability 16 within a distributed network 10, the packets may encounter nodes structured such as is shown in FIGS. 3*a*-3*c* at 30*a*, 30*b*, 30*c*. Depicted in these three schematics are alternative routings (38*a*-38*c*, 39*a*) of packet processing through a node. Here, by way of example, each router unit has three front-end, or input, port units (31*a*-33*a*, 31*b*-33*b*, 31*c*-33*c*) and three back-end, or output, port units (several of which have been labeled: 34*a*-36*a*, 34*b*, 35*c*) as well as a centralized location containing switch fabric components (37*a*-37*c*). As represented (key), input and output processing can be through 'normal'/conventional processing 39*a* or through one or more of the associative stores (pathways 38*a*-38*c* through at least one ESP box) dedicated at each input and output port and centralized location. By moving ESP functionality away from central router processing (37*a*-37*c*) to one or more port units (such as those labeled 31*a*-33*a*, 31*b*-33*b*, 31*c*-33*c*, 34*a*-36*a*, 34*b*, and 35*c*) efficiently uses available port resources, allowing ESP to be generally transparent to main routing function (37*a*-37*c*).

The FIG. 4*a* high level schematic view of representative hardware components (including primary inputs and outputs) of a preferred processing unit 40 includes functional units for carrying out ESP packet receipt, tag-value binding, and macro and micro instruction execution functionalities at any of the specially-adapted nodes (equipped with dedicated associative store and processing components). These functionalities may be performed at the front-end, the back-end or a centralized location of the node (30*a*-30*c* in FIGS. 3*a*-3*c*). Referencing FIGS. 4*a*-4*b* and 6 (beginning with boxes 61 and 62 as stated): Incoming packet information is input through a packet register 41; macro controller 42 decodes macro opcode instruction (packet 48) and generates an address for execution in micro instruction memory 43*b* (box 63); then micro opcode sequence is initiated (box 64), giving instructions to micro instruction register 43*c* for decoding and processing; micro (μ) controller 43*a* generates control signals for respective functional modules as each micro-level instruction executes at designated location(s) of node (aided by an ALU 47). This results in decoding of the Tag Register(s), Value Register(s), and Location Register(s) as well as employing associative store (ESS) control 44a, utilizing its ephemeral state memory 44b, to perform instructions such as look for a pre-selected tag in the packet, bind a tag to a value to form a (tag, value) pair only accessible within ESS 44b for short period, τ. FIG. 6 also shows that packets traveling through unit 40 (FIG. 4a) may be dropped (65 and 66) or may be passed on through to the next ESP-capable node toward its identified destination. As mentioned above, for scalability, a value τ is chosen to be as short as possible—while for robustness, it should be long enough for computations to be completed. For example, τ may be chose to be less than a product of six multiplied by a packet round-trip time (RTT) of a majority of any particular type of packets through the distributed network, or τ<6*98% RTT, placing τ on the order of 10 seconds.

By way of example only, FIG. 4b schematically depicts a packet 48 of the type anticipated for receipt by processing unit 40 represented in FIG. 4a. The Flag field contains an abort bit A and an error bit E along with unused bits reserved for use. A and E bits can be set in each processed packet to indicate that that current packet processing has been aborted or an error has been encountered in packet processing. An OPCODE field (of a selected length) is depicted and may specify a network macro opcode that identifies an instruction. LENGTH field corresponds to length of the ESP packet 48. LOC identifies location of instruction(s) execution (which node and where within node). A CRC field with a cyclic redundancy check code for the packet may be included. A VAR. FIELD is depicted and may contain a pre-selected tag and/or value and/or a micro opcode depending upon the macro instruction. For example, one macro operation identified further in ATTACHMENT A as COUNT is deployed to count packets passing through a particular router/node needs only a tag in VAR. FIELD. COUNT instruction pseudocode (see, also, ATTACHMENT A) follows:

If (C not in ESS)
   bind (C, 1)
   forward pkt
else
   increment value bound to C
   if ([value of C] <Threshold) forward pkt
   else discard pkt Another instruction identified in ATTACHMENT A as COMPARE takes operands which may be carried in the packet: a tag V identifying the value of interest in the ESS, an immediate value pkt.value that carries the 'best' value found so far, an immediate value nodeid identifying the node with the best value, and an immediate value <op> used to select a comparison operator to apply (e.g., <, ≧, etc.). The COMPARE instruction tests whether the relation specified by <op> holds between a value being carried by the packet and the value in the ESS. If so, the value from the packet replaces the value in the ESS, the node's identity is recorded in the packet, and the packet if forwarded. The COMPARE instruction can be used in a variety of ways but is particularly useful in situations where only packets containing the highest or lowest value seen by the node so far are allowed to continue on. Pseudocode for COMPARE instruction (see, also, ATTACHMENT A) follows:

If (V not in ESS)
   bind (V, pkt.value)
   forward pkt
else if ([value of V] <op> [pkt.value])
   bind (V, pkt.value)

nodeid=This NodeID
   forward pkt
else discard pkt

Figure 5:
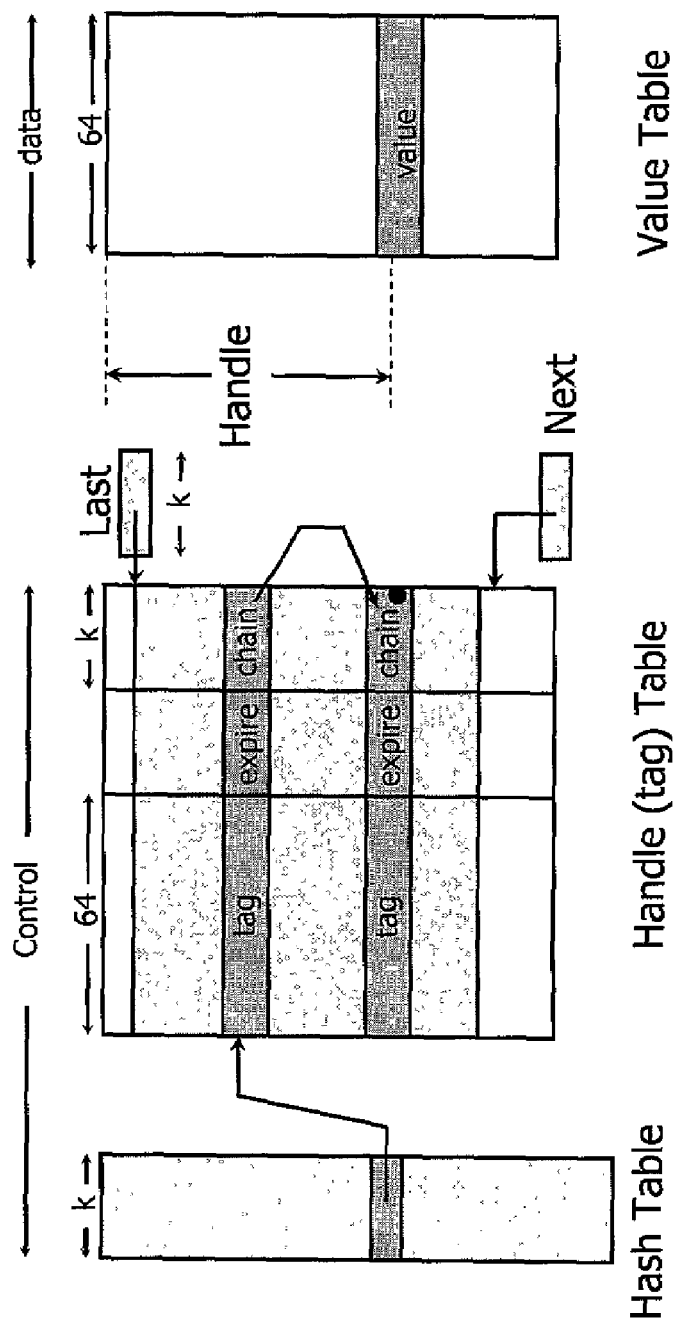

FIG. 5 schematically depicts one preferred implementation 50 of assisting with the functionalities of locating and comparing tags of incoming packets to those already bound, and retrieving and writing respective value(s) according to computation task. As indicated by way of example at the bottom of FIG. 5, tag space is preferably selected noting that a store of size $2^k$ bindings requires:

$$128+(h+1)k+z \text{ bits} \qquad \text{Eqn. [1]}$$

where h=(hash table size/store size) and z=time stamp size. To remain scalable and cost-effective to implement, commodity associative memory is preferred: one part of RAM (the data store-64 bits per entry, for example) may be set aside for storing only the values associated with tags; with the remaining part (the 'associative store') implements the association between tags and data store locations. As depicted in the FIG. 5 embodiment, control store consists of two tables and two registers. The Hash Table stores indices into the tag (Handle) Table. The number of entries in the tag table is the same as the store capacity; thus, if the store capacity is of size $2^k$, each has table entry is k bits. The size of the hash table can be anything, but preferably for efficiency is at least the size of the store.

Each tag in the ESS has an entry in the tag table; the associated value is stored in the same entry of the data store. In addition to the tag itself, each entry in the tag table contains the expiry time of the entry (a z bit value), and a chain pointer, which operates as the index of another entry in the table (i.e., another k-bit value). As shown, in addition to a clock, which has a resolution of z bits and is incremented periodically, the associative store has two registers, next and last, which point to the next entry to be allocated and the next allocated entry to expire, respectively. The chain field of each tag table entry chains together entries that hash to the same hash table index. The entries in this chain are ordered from oldest to newest; and the end of the chain is terminated by a null pointer. Advantages of this embodiment are many, including: factored design allows components to be implemented in different types of memory—the associative store in SRAM and data store in DRAM—for optimization of memory usage (an important consideration in router design); and it is efficient in time overhead.

The flow diagram in FIG. 7 depicts one preferred implementation of a process of the invention 70 utilizing a processing unit such as that shown at 40 in FIG. 4a and an ESP packet such as the types depicted in FIGS. 2 and 4b. Beginning at box 71, once a packet is received at a node (into packet register 41, FIG. 4a), the TAG contained therein is placed into a Tag Register (46a, FIG. 4a) and compared to the set of earlier bound (tag, value) pairs in the associative store (44b, FIG. 4a). If no match is found for an incoming TAG (72), a NULL is returned to Location Register (46c, FIG. 4a) and LOCAdd is deemed "invalid", A bit is set to 0 (see discussion of Flag(s), FIG. 4b). Otherwise, the following occurs (74): (a) return the location address (LOCAdd) within ESS of the (tag, value) pair match, to Location Register (46c, FIG. 4a); (b) check validity of location address (LOCAdd); and (c) compare CLOCK of incoming ESP packet arrival time with expiry time, τι. If the expiry time, τι, for that packet has not expired A bit is set to 1 (77). If the read operation is executed, load the value bound to the matched TAG—from the bound (tag, value) pair at LOCAdd—into the Value Register (78). If the read operation is not executed, bind the contents of the Value Register to TAG by writing them to the location at LOCAdd (79). Once an expiry time is calculated, it is preferably set for all bindings in ESS for a set of computations.

By way of example, FIG. 8 schematically depicts further detail of functional units of ESP features represented in FIG. 4a to assist in carrying out the processes set forth in FIGS. 6 and 7.

By way of further general background reference: The central processing unit (CPU) is the computing part of the computer. Also often referred to simply as the processor, a CPU is made up of the control unit and an arithmetic logic unit (ALU)—a high-speed circuit that does calculating and comparing. Numbers are transferred from memory into the ALU for calculation, and the results are sent back into memory. Alphanumeric data is sent from memory into the ALU for comparing. The CPUs of a computer may be contained on a single chip. As is well known, the basic elements of a simple computer include a CPU, clock and main memory; whereas a complete computer system requires the addition of control units, input, output and storage devices, as well as an operating system. Once the data is in a computer's memory, the computer can process it by calculating, comparing and copying it; generally understood as follows: calculating—performing any mathematical operation on data by adding, subtracting, multiplying and dividing one set with another; comparing—analysis and evaluation of data by matching it with sets of known data that are included in a program or called in from storage; and coping—the moving of data around to create any kind of report or listing, etc., in a selected order. Instruction means generally any computation carried out at a node which can be triggered by processing a specialized packet carrying opcode for that instruction. A computation operates on (i.e. takes as input and/or produces as output) one or more operands, each of which may be carried in the packet or stored in an associative store. An opcode ("operation code"), whether further identified as macro- or micro-opcode, is any bit sequence carried in the packet that identifies the machine instruction to be executed.

While certain representative embodiments and details have been shown merely for the purpose of illustrating the invention, those skilled in the art will readily appreciate that various modifications, whether specifically identified herein, may be made to these representative embodiments without departing from the novel teachings or scope of this technical disclosure. Accordingly, all such modifications are intended to be included within the scope of the claims. Although the commonly employed preamble phrase "comprising the steps of" may be used herein, or hereafter, in a method claim, the Applicants do not intend to invoke 35 U.S.C. Section 112 §6. Furthermore, in any claim that is filed herewith or hereafter, any means-plus-function clauses used, or later found to be present, are intended to cover at least all structure(s) described herein as performing the recited function and not only structural equivalents but also equivalent structures.

What is claimed is:

1. A system for providing auxiliary information about a distributed network of shared nodes, at least a plurality of the nodes adapted for receiving a first type of packets, the system comprising:

each said first type packet having at least one field comprising an opcode identifying an instruction, and a tag; and available for access at each of the plurality of nodes is a dedicated associative ephemeral state store wherein each said tag may be bound to a value and, if so bound, is only accessible as a bound (tag, value) pair for a finite time period, $\tau$.

2. The system of claim 1 further comprising at least one operand associated with said opcode instruction for execution on said operand at any of the plurality of nodes; and wherein said time period, $\tau$, is less than a product of six multiplied by a round-trip time of the first type of packets through the distributed network.

3. The system of claim 2 wherein:

each said tag is randomly pre-selected;

each said first type packet further comprises a respective one of said operands associated with said opcode instruction, an LOC field containing an identifier of a location for said execution of said opcode instruction, and a destination ID; each said first type packet passing only through the plurality of nodes toward a respective destination associated with said destination ID.

4. The system of claim 2 further comprising a processing unit at each of the plurality of nodes for overwriting said tag for any said first type packet received as directed according to said instruction; and wherein each said tag is a fixed-length bit string, and said operand associated with said opcode instruction is retrieved from a respective one of said ephemeral state stores.

5. The system of claim 1 wherein an auxiliary information is so provided, the auxiliary information to comprise information selected from the group consisting of: information about a computational state of any of said plurality of nodes cooperating to implement an application service; information comprising feedback about any of a plurality of receivers of a multicast group; information about at least one node of the shared nodes; information about the distributed network's state; information about at least one feature of the distributed network's topology; location information about at least one active service within the distributed network; information about messages transmitted within the distributed network; and statistical performance information about at least one aspect of the distributed network.

6. The system of claim 1 wherein a plurality of said bound (tag, value) pairs are made, each said pair being stored in one of said dedicated associative stores; and further comprising a unit in communication with said one dedicated associative store for comparing said tag within each said first type packet received by the node to which said one associative store is dedicated, with each respective tag of said plurality of bound (tag, value) pairs, and for every said tag matched, accessing its said bound value.

7. The system of claim 1 wherein each of the plurality of nodes has input and output port units and a centralized location, said dedicated associative store being accessible from said input port unit, accessible from said output port unit is a second dedicated associative store, and accessible from said centralized location is a third dedicated associative store; and each said first type packet further comprises an LOC field containing an identifier of a location of execution of a respective one of said instructions.

8. The system of claim 1 wherein each of the plurality of nodes has input and output port units and a centralized location, said dedicated associative store being accessible from said output port unit, accessible from said input port unit is a second dedicated associative store, each said first type packet further comprises at least one operand associated with said opcode instruction for execution on said operand at any one of said output port units.

9. The system of claim 1 further comprising a second type of packets, each said second type packet having at least one field comprising a second opcode identifying a second instruction, and an LOC field containing an identifier of a location for execution of said second instruction at any of the plurality of nodes.

10. The system of claim 9 wherein: each said second instruction differs from packet-to-packet of said second type packets; and a second packet sequence comprising at least a portion of said second type packets is received by at least one of the plurality of nodes such that said second instruction of each said second type packet so received is executed in a second program sequence at said at least one of the plurality of nodes.

11. A system for providing auxiliary information about a distributed network of shared nodes, at least a plurality of the nodes adapted for receiving a second type of packets, the system comprising:
   each said second type packet having at least one field comprising a second opcode identifying a second instruction, and an LOC field containing an identifier of a location for execution of said second instruction at any of the plurality of nodes; and
   available for access at each of the plurality of nodes is a dedicated associative ephemeral state store wherein a value, if bound to a tag, is only accessible as a bound (tag, value) pair for a finite time period, $\tau$.

12. The system of claim 11 further comprising a first type of packets; each said first type packet having at least one field comprising a first-packet macro opcode identifying a first instruction, and a pre-selected tag; and one of said values is so bound to one of said tags within one of said dedicated associative stores, said bound value being accessed by a later-received first type packet prior to expiration of said time period, $\tau$.

13. The system of claim 11 further comprising a first type of packets; each said first type packet having at least one field comprising a first-packet macro opcode identifying a first instruction, and a pre-selected tag; a first packet sequence comprising at least a portion of said first type packets is received by at least one of the plurality of nodes such that said first-packet opcode instruction of each said first type packet so received is executed in a program sequence; and one of said values is so bound to one of said tags within one of said dedicated associative stores.

14. The system of claim 11 wherein a second packet sequence comprising at least a portion of said second type packets is received by at least a first and second one of the plurality of nodes such that said second instruction of each said second type packet so received is executed in a second program sequence at each of said first and second one of the plurality of nodes.

15. The system of claim 11 wherein each said second type packet further comprises a respective operand associated with said second instruction, each of the plurality of nodes has input and output port units and a centralized location, said dedicated associative store being accessible from said input port unit, accessible from said output port unit is a second dedicated associative store; and said identifier of a respective one of said locations to comprise a node location and a port location thereof.

16. The system of claim 11 wherein a respective operand associated with said second instruction is retrieved from a respective one of said associative stores once one of said second type packet is received by one of the plurality of nodes according to said identifier contained within said LOC field, and said second instruction is executed at said location.

17. The system of claim 11 wherein an auxiliary information is so provided, the auxiliary information to comprise information selected from the group consisting of: information about a computational state of any of said plurality of nodes cooperating to implement an application service; information comprising feedback about any of a plurality of receivers of a multicast group; information about at least one node of the shared nodes; information about the distributed network's state; information about at least one feature of the distributed network's topology; location information about at least one active service within the distributed network; information about messages transmitted within the distributed network; and statistical performance information about at least one aspect of the distributed network.

18. A process for providing auxiliary information about a distributed network of shared nodes, at least a plurality of the nodes adapted for receiving a first type of packets, the method comprising the steps of:
   providing a dedicated associative ephemeral state store at each of the plurality of nodes;
   receiving, at any of the plurality of nodes, a plurality of the first type packets; each said first type packet received having at least one field comprising an opcode identifying an instruction, and a tag; and
   creating a binding of each said tag of said first type packet received to a value within said dedicated associative store at said one node, said binding only accessible as a bound (tag, value) pair within said dedicated associative store for a finite time period, $\tau$.

19. The process of claim 18 further comprising the steps of executing each said opcode instruction of each said first type packet so received on a respective operand being carried by said first type packet to said one node, and discarding each said bound (tag, value) pair so made upon expiration of said time period, $\tau$.

20. The process of claim 18 wherein said step of receiving further comprises receiving said plurality of first type packets through an input port unit of said any of the plurality of nodes, said dedicated associative store being accessible from said input port unit; and further comprising the step of retrieving, from said associative state store, an operand associated with each said opcode instruction for execution thereof at said input port unit.

21. The process of claim 18 further comprising, after said step of receiving, the step of comparing each said tag within each said first type packet received with each respective tag of a plurality of bound (tag, value) pairs earlier made and still accessible within said associative state store, and for every tag matched, accessing its said bound value.

22. A process for providing auxiliary information about a distributed network of shared nodes, at least a plurality of the nodes adapted for receiving a first and second type of packets, the method comprising the steps of:
   providing a dedicated associative ephemeral state store at each of the plurality of nodes, such that any value bound to a tag within any said dedicated associative store as a bound (tag, value) pair, is accessible only for a finite time period, $\tau$,
   receiving, at any of the plurality of nodes, at least one said second type packet, each said second type packet having at least one field comprising a second opcode identifying a second instruction and an LOC field containing an identifier of a location for execution of an operand by said instruction at said any of the plurality of nodes; and
   executing said instruction according to said opcode at said location.

23. The process of claim 22 further comprising the steps of: receiving, at any one of the plurality of nodes, a plurality of the first type packets each having at least one field comprising a first opcode identifying a first instruction, and a fixed-length randomly pre-selected tag; and overwriting said fixed-length tag or said value once received by said any one of the plurality of nodes, if so directed by an associated one of said first instructions.

24. The process of claim 22 further comprising the steps of: receiving, at any one of the plurality of nodes, at least one of the first type packets each having at least one field comprising a first opcode identifying a first instruction, and a pre-selected tag; and once said at least one said first type packet is received, binding a respective value to said pre-selected tag into a first one of said bound (tag, value) pairs for accessibility within a respective one of said dedicated associative stores for said time period, $\tau$.

25. The method of claim 24 wherein: said step of receiving said at least one first type packet further comprises receiving a first packet sequence comprising at least a portion of said first type packets through an input port unit of said any one of the plurality of nodes such that said first instruction of each said first type packet received is executed in a program sequence; and said dedicated associative store is accessible from an output port unit of said any one of the plurality of nodes.

* * * * *

UNITED STATES PATENT AND TRADEMARK OFFICE
CERTIFICATE OF CORRECTION

PATENT NO. : 7,317,729 B2  Page 1 of 1
APPLICATION NO. : 10/131315
DATED : January 8, 2008
INVENTOR(S) : Kenneth L. Calvert and James N. Griffioen It is certified that error appears in the above-identified patent and that said Letters Patent is hereby corrected as shown below:

Cover page, top margin reads in bold print "Calver et al." should be replaced with -- Calvert et al. --

Cover page item (75) Inventors: reads "Kenneth L. Calver" should be replaced with -- Kenneth L. Calvert --

Signed and Sealed this

Sixth Day of May, 2008

JON W. DUDAS
*Director of the United States Patent and Trademark Office*